Sept. 28, 1954              E. WOLF              2,690,554

ULTRAVIOLET FILTER FOR CATHODE-RAY TUBES

Filed March 9, 1950              6 Sheets—Sheet 1

INVENTOR
ERNST WOLF
BY
ATTORNEY

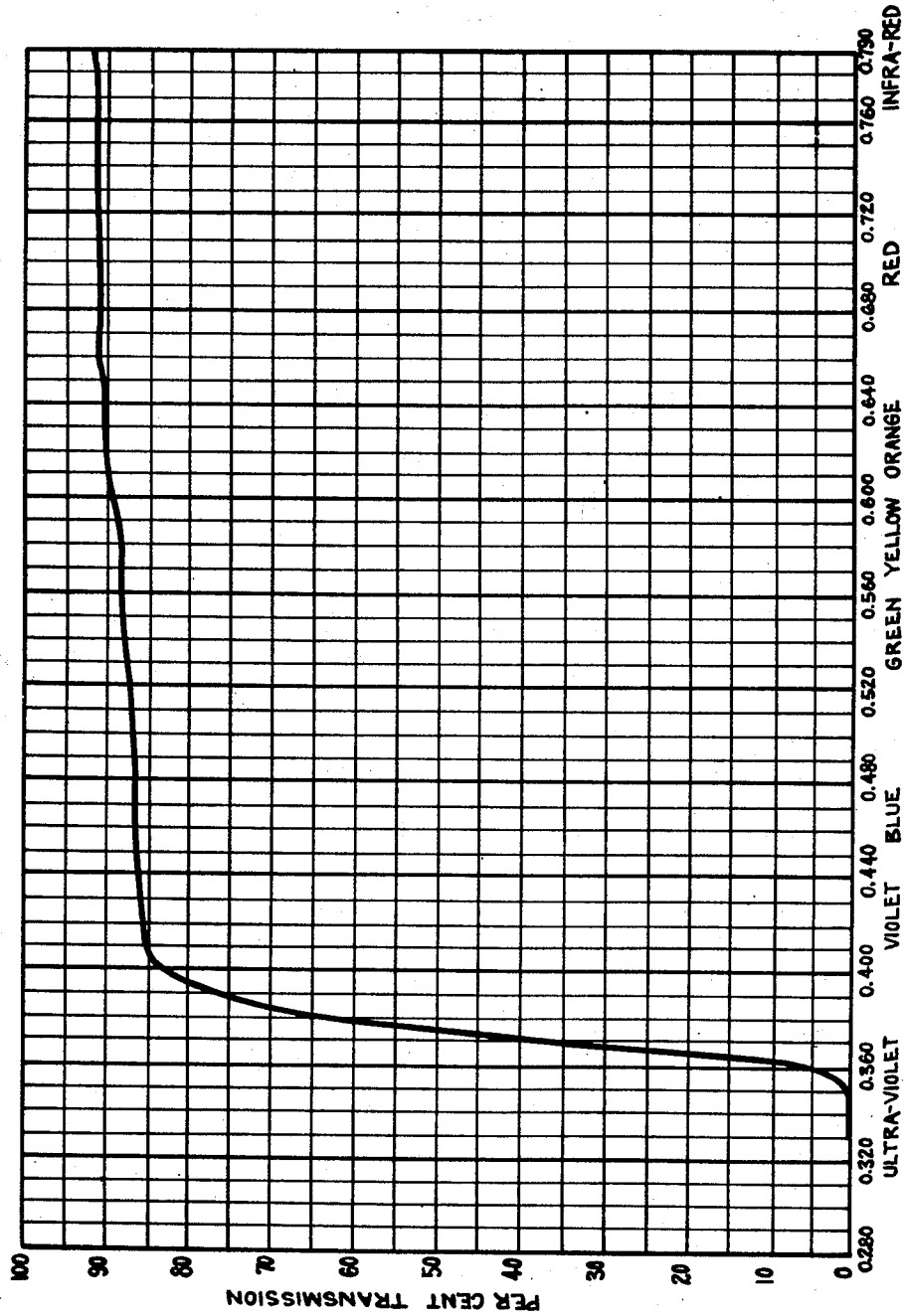

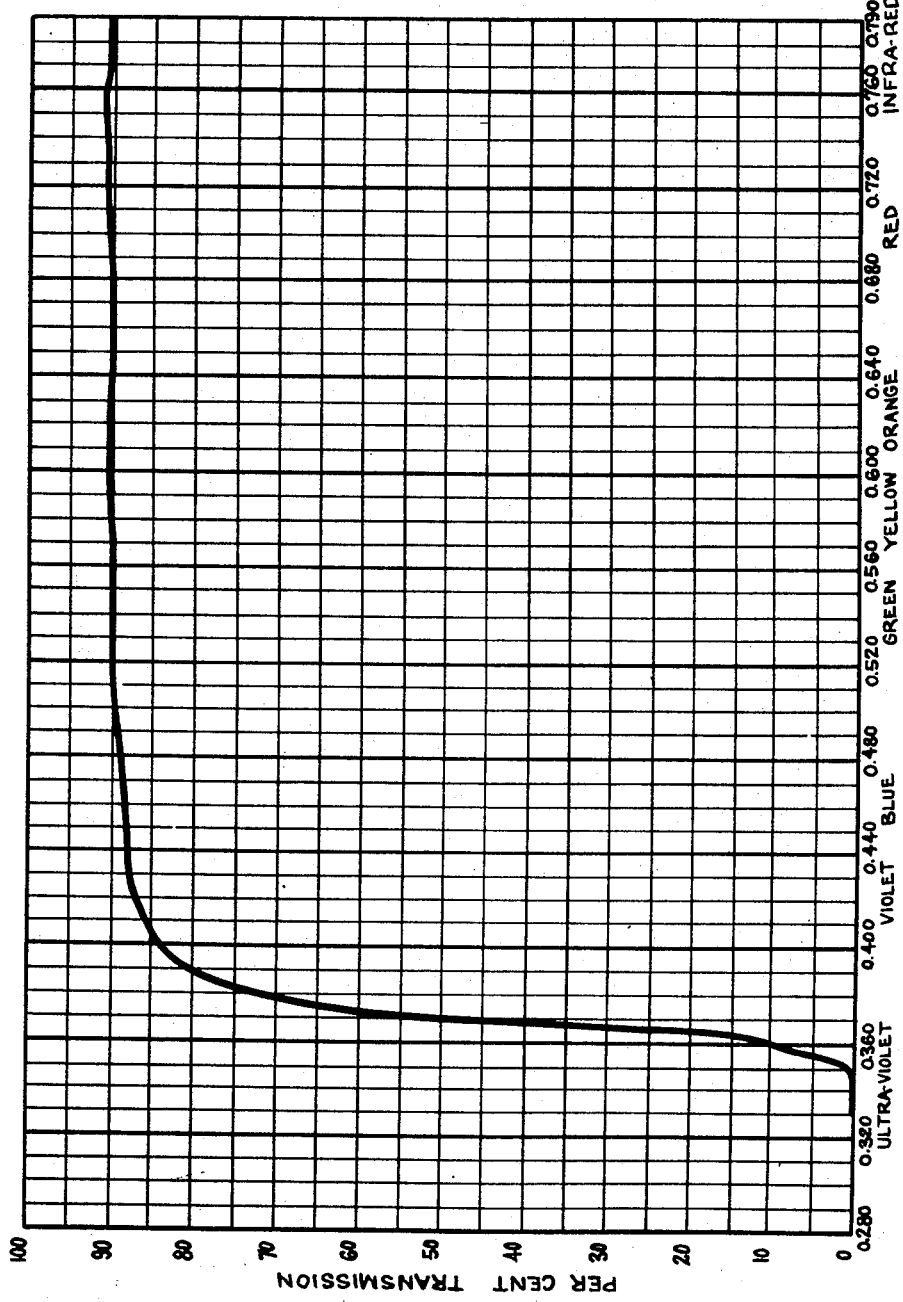

Patented Sept. 28, 1954

2,690,554

UNITED STATES PATENT OFFICE 2,690,554

ULTRAVIOLET FILTER FOR CATHODE-RAY TUBES

Ernst Wolf, Watertown, Mass., assignor to American Optical Company, Southbridge, Mass., a voluntary association of Massachusetts Application March 9, 1950, Serial No. 148,567

2 Claims. (Cl. 340—369)

This invention relates to visual altering systems for use in television and particularly to the provision of a system and method of maintaining the threshold of vision of an observer at substantially the normal level when viewing the television cathode ray tube screen of a television receiver.

It has been found that visual fatigue occurs in various forms after observation of television and it is therefore a principal object of this invention to provide television cathode ray tubes with means for maintaining the threshold of vision of an observer at substantially the normal level and consequently reducing visual fatigue in an observer and method of obtaining said results.

Another object is to provide a television cathode ray tube or kinescope having a face portion thereof so formed that selected light rays emanating from the image-forming fluorescent screen which tend to raise the visual threshold of the observer will be at least partially absorbed and thereby prevented from passing to the observers' eyes and causing subsequent visual fatigue.

Another object is to provide a kinescope tube embodying means for absorbing certain light rays emanating therefrom for reducing or eliminating visual fatigue of the observer by increasing contrast discrimination of the image as viewed while avoiding change of color, with resultant increase in the recovery of the observers' eyes after exposure.

Another object is to provide a television cathode ray tube with transparent filtering means having a visual stimulating pink tint which tends to mellow the normally cold appearance of the image and aids in increasing contrast discrimination of the image and yet has no perceptible effect upon the color of the image as viewed by an observer.

Other objects and advantages of the invention will become apparent from the following description taken in connection with the accompanying drawings, in which:

Figs. 10 and 11 are graphs illustrating the light transmission curves of two types of glass formed in accordance with the present invention.

It is well known that visual fatigue has been reported in various forms after observation of television, and in consequence of this various devices have been developed in an attempt to eliminate visual discomfort. Many prior attempts have been in the form of filters of various shades and densities which are inserted in front of the television kinescope tube and which attempt to overcome the difficulties by absorbing certain of the rays of the visible spectrum and consequently altering the color appearance of the screen. However, the use of such filters is undesirable, particularly in color television, since the clearness of the images depends a great deal upon the contrast between various parts thereof, and the contrast is definitely reduced by colored filters.

The present invention, however, aids in the reduction of visual fatigue primarily by overcoming the influence of ultra-violet radiation. By providing means and method whereby such influencing radiation is eliminated it has been found that the thresholds of vision of observers are maintained at substantially the normal level with consequent benefit to the observers' eyes due to less eye strain and maintenance of such functions as visual acuity, range of seeing, contrast discrimination and frequency of seeing at normal level. As a result, the visual mechanisms of the observers are under less stress, less discomfort is experienced, and visual fatigue is appreciably reduced or entirely eliminated.

Figure 1:
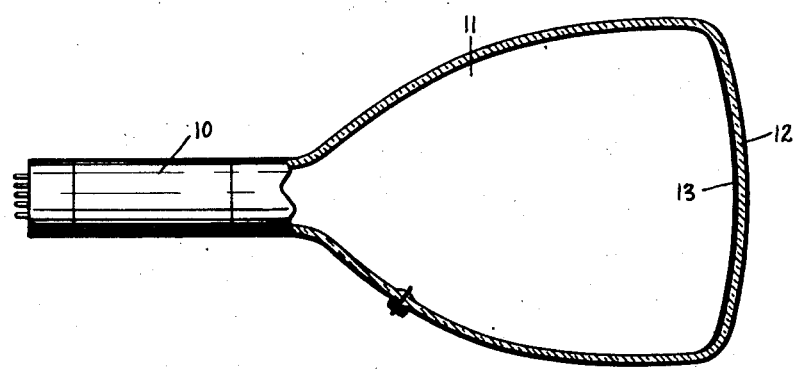
Fig. 1 is a side elevational view partly in section of a television cathode ray tube or kinescope embodying the invention.

A cathode ray tube of the type used for television receivers and known as a kinescope is shown in Fig. 1 and is a vacuum tube formed with a neck portion 10, substantially conical sides 11, and a face portion 12 all of which may be formed integral of a suitable glass. However, the sides and neck may be formed of metal and the face portion alone of glass, if desired, whereupon the glass must be suitably sealed to the metal. Other important features to be considered with respect to the glass include the ability of the glass to withstand atmospheric pressure which on the face portion alone is believed to approximate 1700 pounds, ability to meet electrical requirements, ability to withstand high temperatures, and it must further have controlled light transmission characteristics.

The inner surface of the tube face portion 12 is coated with a thin layer 13 of suitable fluorescent material which when bombarded by electrons will fluoresce to form an image which may be viewed through the face portion 12.

It has been found that there is some emission of light rays from the fluorescent material below 3800 Angstroms in the spectrum. In the belief that such rays are undesirable and affect an observer's eyes so as to cause poorer vision, i. e., poorer visual acuity, range and frequency of seeing, and contrast discrimination, eye examinations of individuals have been made and charted immediately after exposure and it has been found that desirable and beneficial results are obtained by filtering out these rays by the use of means formed in accordance with this invention which have been used for the purpose of overcoming the above undesirable features.

Figure 4:
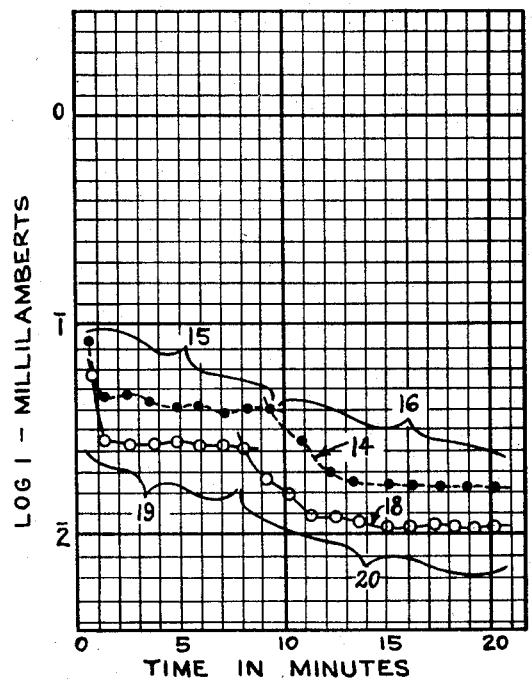
Figs. 4 and 5 are graphs depicting the effects of light emanating from a kinescope upon the eyes of respective observers.

As an example, an observer, designated herein as observer A, upon exposure to direct unfiltered rays emanating from the kinescope tube will be visually affected by the rays, and when tested at substantially equally spaced time intervals for dark adaptation, the tests will indicate a curve as indicated by numeral 14 in Fig. 4 of the drawings. In carrying out such tests the observer is first positioned at a specified distance from the tube, the distance in these tests being six feet, and required to look at the center of the screen for a controlled length of time, which was ten minutes. After such exposure tests for visual sensitivity are made, the results indicate that the dark adaptation curve is formed with two distinct segments, the upper segment 15 being ascribed to the adaptation of the cones of the eyes and the lower segment 16 to the adaptation of the rods. It will be noted in Fig. 4 that the shift from cone adaptation of observer A to rod adaptation occurs after about 9½ minutes and that adaptation is complete after twenty minutes.

Figure 5:
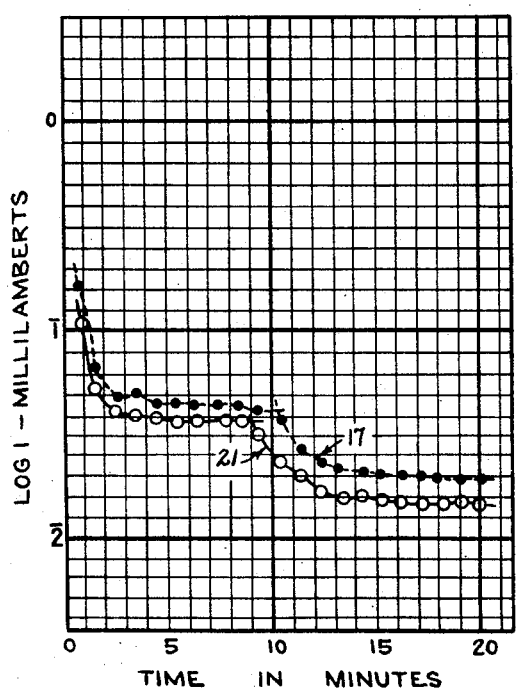

Tests of a second observer, designated as Observer B, show a dark adaptation curve as indicated by numeral 17 in Fig. 5 which is quite similar to the curve of observer A except that the shift from cones to rods occurs after approximately 10½ minutes.

In accordance with the present invention, it is desired to maintain the threshold of vision at substantially the normal level whereupon observers of television will be less fatigued due to less eye strain which results from the higher intensity of light which, due to the above findings, is necessary for satisfactory contrast discrimination of the image being viewed. It is known that certain light rays, particularly those below 3600 Angstroms, affect vision by delaying dark-adaptation and, therefore, raises the final thresholds appreciably above the normal level. Consequently, means are desired to overcome the foregoing objections by eliminating the rays which cause such delay of dark adaptation and which means will not affect the perception of the visible spectrum.

To accomplish this, a glass having a composition so formulated as to cut out the undesirable light should be used for the face portion 12 of the kinescope and in accordance with this invention it has been found that glass such as crown or flint glass having added thereto a controlled amount of a selected ingredient for providing the desired absorption will provide the desired results. Such a glass must transmit substantially equal amounts of light throughout the visible portion of the spectrum while absorbing undesirable light in the ultra-violet region of the spectrum. One suitable glass for this purpose is a silica-soda-potash-lime glass having cerium added thereto as an ingredient which will render the glass absorbent of practically all light below 3600 Angstroms as shown in Figs. 10 and 11. Such a glass will have a chemical analysis as follows:

TABLE A

| Ingredient: | Specific amount in percent |
|---|---|
| $SiO_2$ | 69.7 |
| $Na_2O$ | 9.2 |
| $K_2O$ | 7.0 |
| $CaO$ | 9.3 |
| $CeO_2$ | 4.0 |
| $MnO_2$ | 0.2 |

It will be noted that the analysis includes traces of $MnO_2$ which is used to give the resultant glass a slight pink tint. The slight pink tint is believed to stimulate the visual mechanism of the observer and tends to give a warm, mellow and more pleasing tone to the normally cold or harsh appearance of the image seen on a screen of a television kinescope. The pink color desired is so slight, however, that it has no perceptible effect on the visual ray transmission of the glass.

Other glasses satisfactory for this purpose would comprise, for example:

TABLE B

| Ingredient: | Percent |
|---|---|
| $SiO_2$ | 69 |
| $Na_2O$ | 16 |
| $CaO$ | 9 |
| $CeO_2$ | 5 |

TABLE C

| Ingredient: | Percent |
|---|---|
| $SiO_2$ | 68 |
| $CaO$ | 9 |
| $Na_2O$ | } 17 |
| $K_2O$ | |
| $CeO_2$ | 4 |
| $Al_2O_3$ | 1 |

Each of the above compositions, however, would also include small amounts of other ingredients such as zirconium oxide, titanium oxide, zinc oxide, arsenic oxide, antimony oxide, boron oxide and/or magnesium oxide for providing other desired characteristics in the glass in the usual manner. Also satisfactory would be substantially colorless or pinkish tinted glasses using vanadian or other ingredients to provide the glass with ultra-violet absorbing characteristics, such as:

TABLE D

| Ingredient: | Parts by weight |
|---|---|
| $SiO_2$ | 70.4 |
| $Na_2O$ | 8.7 |
| $K_2O$ | 8.2 |
| $CaO$ | 10.5 |
| $Cl_2$ | 0.6 |
| $SO_3$ | 0.6 |
| $V_2O_5$ | 0.8 |
| With or without $MnO_2$ | 0.2 |

It is to be understood that all of the aforementioned glasses can be produced by conventional methods with the addition of the necessary agents for controlling the fining, oxidation, etc.; also that all of the ingredients can be varied widely as to amounts used to produce a satisfactory glass having the desired characteristics.

Although it is preferable to form the tube face portion 12 of an absorbing glass of the above character, the desired results can be accomplished by positioning a filter into the light path between the tube and the observer. In this case the filter may be formed of any transparent material having the desired visible transmission and ultra-violet absorbing characteristics. Such a filter may be formed of various clear plastics or resinous materials having ingredients added thereto for absorbing ultra-violet rays. Satisfactory for this would be materials such as polymethyl methacrylate or cellulose acetate having controlled amounts of materials such as phenyl salicylate added thereto as ultra-violet absorbers.

Still other forms of filters satisfactory for the purpose of maintaining the threshold of vision at a substantially normal level would be a laminated type comprising superimposed layers of conventional glass or other clear transparent material having a layer of a transparent plastic material therebetween and joined by layers of cementitious material, at least one of the layers of glass, plastic or cementitious material possessing the ultra-violet absorbing characteristics desired. Such a cement should, of course, be highly transparent, colorless, and stable, such as is produced by combining controlled amounts of chlorinated paraffin wax, rosin, phenyl salicylate, and polyethylene glycol dimethacrylate.

In continuing the foregoing tests of the eyes of observers A and B to determine the effect of television upon dark adaptation and the threshold of vision, it was found that upon placing a sheet of filter media approximately 2 millimeters thick and having a transmission curve corresponding substantially to the curve shown in Fig. 10 between the kinescope and the eyes of the observers for filtering the radiation from the kinescope, the effect upon the observers' eyes was noticeably different than when the radiation from the kinescope passed unfiltered directly to the eyes.

This condition is shown in Fig. 4 for observer A where it will be noted that the dark adaptation tests following exposure to filtered radiation results in the substantially normal curve indicated by numeral 18. In comparision with curve 14, the flat part of the cone segment 19 is shifted to a lower intensity level, the shift being approximately 0.15 log. unit; the onset of rod adaptation is advanced about one and a half minutes, and the rod segment 20 is shifted downwardly, yielding a final threshold which is lower than the threshold for direct unfiltered vision by approximately 0.20 log. unit.

For observer B (Fig. 5) the cone segment of the substantially normal resultant curve 21 is shifted to a lower level, the shift being approximately 0.10 log. unit, the onset of rod adaptation is advanced about one minute, and the rod segment is shifted downwardly about 0.15 log. unit.

It is clearly apparent that the dark adaptation curves are distinctly separated throughout their entire extent in both the cone and rod segments, and the curves 18 and 21 which are obtained when the radiation during exposure to the kinescope is filtered are decidedly lower than the curves 14 and 17 which are obtained after exposure to unfiltered radiation and indicate that the threshold of vision is maintained at substantially the normal level when the radiation is filtered as described.

Each of the foregoing tests were made after exposure to television cathode ray tube radiation for ten minutes, at a distance of six feet, with and without the filter means, by using a visual discriminometer for dark adaptation tests. This visual discrminometer embodies an eye piece through which a red fixation point is visible. It further embodies a test image which may be illuminated, which test image has a series of equally spaced black and white lines.

The observer or person to be tested, after exposure to the television tube radiation for the period of ten minutes, as specified above, is asked to look through the eye piece and to fix on the red fixation point. The instrument operator, while the observer views said fixation point, illuminates the test image at a known intensity of illumination for a known period of time. In this particular instance this duration of time is approximately ⅕₂₅ of a second. After the first exposure to the test image illuminated at said known intensity for the period of ⅕₂₅ of a second, the observer reports whether or not he can discern the black and white lines. If his report is negative, the intensity is increased a known amount and the image is then re-exposed for ⅕₂₅ of a second and the observer again reports whether or not he can discern the black and white lines. If not, the intensity is further increased and the test repeated. When he reports vision of the black and white lines, the intensity is then lowered a known amount until a border line intensity is reached between the negative and positive reports. The time interval and the intensity of light required to obtain this first finding is recorded on a chart such as shown in Figs. 4 and 5. A controlled time lag is permitted and the test is repeated. The respective time intervals and intensities arrived at are noted and recorded on the chart. This procedure is continued until there is no further increase in sensitivity noted. The time at which readings are taken and the threshold brightnesses are indicated by the curves 14, 17, 18 and 21.

These tests indicate that after a ten minute exposure to the unfiltered radiation of a kinescope, the visual threshold is raised by about 0.2 log. unit over that produced by exposure to filtered radiation. This means that about 1.6 times as much light is necessary to provide the same degree of visual resolution. It has been previously assumed that a threshold rise of 0.2 log. unit means a loss as compared to the normal of 30 to 50 percent in such functions as visual acuity, range and frequency of seeing and contrast discrimination. Hence, the visual mechanism is under stress, discomfort is experienced, and visual fatigue is pronounced. This condition is readily overcome, however, by screening out the undesirable wave range by the use of filter media of the type mentioned above.

To further illustrate that the visual threshold of an observer of a television cathode ray tube may be maintained at a level approximating normal by filtering radiation below 3800 Angstroms from the rays emanating from the tube, the results of tests made as to the effect of ultra-violet light on the foveal and parafoveal elements of the observers' eyes are shown in the drawings.

It is of interest to note here that in previous studies of ultra-violet radiation there were many instances when no clear separation was shown between curves resulting from tests of filtered and unfiltered radiation on the cones or fovea of the eyes. However, by making measurements with a test image which assures the participation of foveal elements only, it was found that a curve separation in the fovea is obtainable when the velocity of adaptation is slowed down by presenting the test image against a background illumination which is higher than the final level to which the cones normally will adapt.

Figure 6:
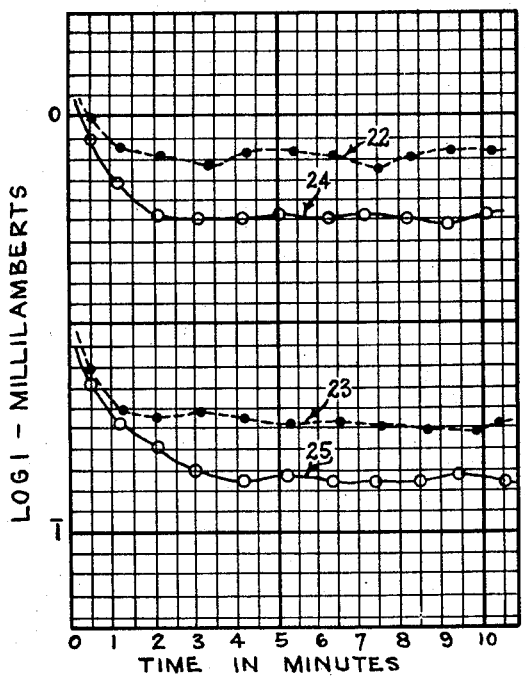
Figs. 6 and 7 are graphs depicting the effect of light emanating from a kinescope upon the foveal regions of the eyes of respective observers.

Tests within the fovea were repeated after exposure to the radiation of the television screen and controlled to limit the area tested to the pure cone population within the limits of the fovea. In Fig. 6 are shown two curves 22 and 23 which indicate two separate tests made of observer A's eyes after exposure to the direct rays from television screen, the tests being made with a background illumination of 40 milliamberts and 4 milliamberts respectively. The curves 24 and 25 were made with the same respective illuminations after exposure to the television screen with the light emitted therefrom being filtered in accordance with the foregoing description.

Figure 7:
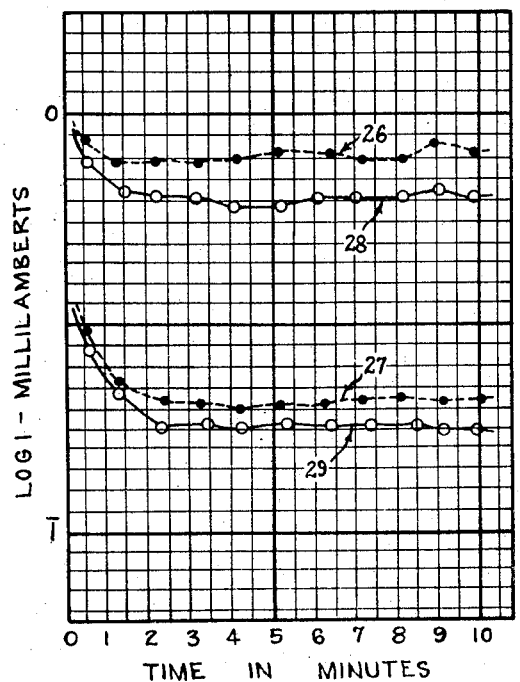

Similar tests were made of observer B, and the curves 26 and 27 (Fig. 7) indicate dark adaptation in the fovea after exposure to the direct rays from the television screen, and curves 28 and 29 after exposure to filtered rays from the screen.

In each case and for both observers the use of the ultra-violet absorbing filter media shifted the entire foveal adaptation curve to lower and approximately normal intensity levels. It will be noted that the threshold differences are generally similar in each case.

Figure 8:
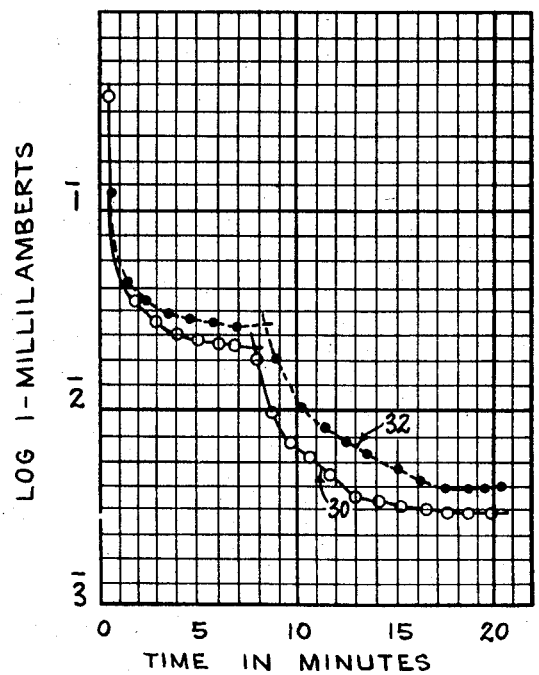
Figs. 8 and 9 are graphs illustrating the effect of light emanating from a kinescope upon the parafoveal regions of the eyes of respective observers.
Figure 9:
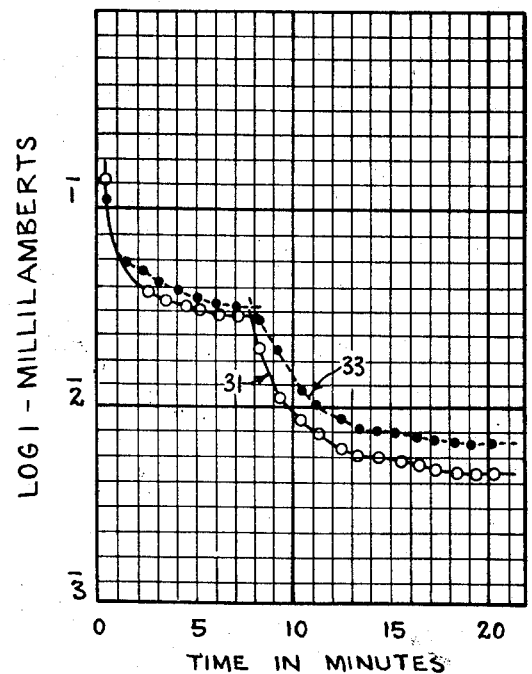

For tests in the parafovea, the observer was required to look at a fixation point six degrees horizontally off from the center of the screen of the television tube during the exposure to the light emitted therefrom. The image is thereby caused to fall into the area to be subsequently checked by the dark adaptation tests. Again, tests with exposure to the rays emanating from the television screen, both directly and filtered, are compared and Figs. 8 and 9 show the results. With both observers the curves 30 and 31 resulting from exposure to the filtered light lie at lower intensity levels than the curves 32 and 33 which are those resulting from exposure to unfiltered light. For the cone segment the shift in each case is slight but clearly recognizable. The onset of rod adaptation is advanced one to one and one-half minutes with a filter, and the entire rod curves lie considerably lower so that the threshold differences for both observers is 0 20 log. unit.

Figure 2:
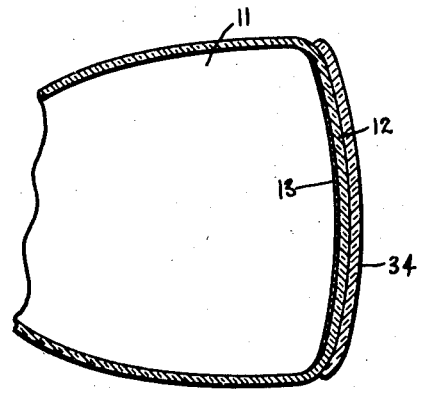
Fig. 2 is a fragmentary sectional view of a kinescope illustrating a second embodiment of the invention.
Figure 3:
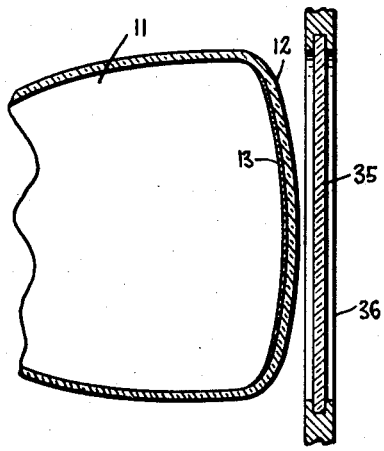
Fig. 3 is a view similar to Fig. 2 illustrating a third embodiment of the invention.

Therefore, from the foregoing it is clearly apparent that an observer viewing a conventional television screen will be visually effected in such a way that the visual threshold is raised by about 0.20 log. unit. This means that 1.6 times as much light is necessary to provide the same degrees of visual resolution and thus is brought about a loss as compared to the normal of 30 to 50 percent in such functions as visual acuity, range and frequency of seeing, contrast discrimination, etc.; hence, the visual mechanism is under stress, discomfort is experienced, visual fatigue is pronounced, and poor dark adaptation results. This condition can, however, be readily overcome by filtering out the undesirable wave range by forming the face portion 12 of the television cathode ray tube of a suitable filter media of the type described hereinbefore, or by applying a layer 34 of the media in superimposed relation with the tube face portion (Fig. 2), or mounting a sheet 35 of the media in front of the tube face either as a separate filter element supported by a suitable frame 36 or as a portion of the television receiver cabinet itself. The filter media will preferably be provided with a visual stimulating pink tint which will mellow the normally cold appearance of the television image without appreciably effecting the visual emission of the tube. In using such a filtering means the visual threshold of an observer is maintained at substantially the normal level whereupon dark adaptation is faster, contrast discrimination is improved, visual acuity and range and frequency of seeing are improved, and visual fatigue and discomfort is appreciably decreased or eliminated.

From the foregoing it will be seen that efficient means have been provided for accomplishing all of the objects of the invention.

While the novel features of the invention have been shown and described and are pointed out in the annexed claims, it will be understood that many changes may be made in the details shown and described without departing from the spirit of the invention. I, therefore, do not wish to be limited to the exact details shown and described as the preferred only are set forth by way of illustration.

I claim:

1. In a television receiver of the type described, the combination of a fluorescent screen which when bombarded by an electron stream modulated by video signals will produce visible radiations to form the desired composite picture and simultaneously emit undesirable ultra violet radiations in the neighborhood of 3600 angstroms and shorter which has the effect of raising the threshold of vision of the observer of the picture by an amount sufficient to introduce visual fatigue, and a transparent member mounted on said receiver so as to be interposed in the normal path of viewing said picture and having an effective area of transmission with respect to the observer's eyes which is at least that of the effective area of the picture being received by said observer's eyes, said transparent member containing ultra violet absorbing means uniformly dispersed throughout said effective area in an amount sufficient to filter out nearly all of said emitted ultra violet radiations, said ultra violet absorbing means being of the type as to introduce substantially no coloring effect and said member being otherwise nearly colorless, said transparent member being such as to reduce the threshold of the observer's vision to substantially normal level while allowing substantially all wave lengths of light in the visible region of the spectrum to be transmitted from said screen substantially unaltered so as not to detract from the observer's viewing of the picture and so as not to materially affect the observer's visual sensitivity for viewing the unfiltered surround after his viewing of the radiations forming said composite picture.

2. In a television receiver of the type described, the combination of a fluorescent screen which when bombarded by an electron stream modulated by video signals will produce visible radiations to form the desired composite picture and simultaneously emit ultra violet radiations in the neighborhood of 3600 angstroms and shorter which has the effect of raising the threshold of vision of the observer of the picture by an amount sufficient to introduce visual fatigue, and a transparent member mounted on said receiver so as to be interposed in the normal path of viewing said picture and having an effective area of transmission with respect to the observer's eyes which is at least that of the effective area of the picture being received by said observer's eyes, said transparent member containing ultra violet absorbing means uniformly dispersed throughout said effective area in an amount sufficient to filter out nearly all of said emitted ultra violet radiations, said ultra violet absorbing means being of the type as to introduce substantially no coloring effect, said transparent member being such as to reduce the threshold of the observer's vision to substantially its normal level so that the observer's visual sensitivity for viewing the unfiltered surround will not be materially affected by viewing of the radiations forming said composite picture, and said transparent member further throughout said effective area having a slight visual stimulating pink sufficient to mellow the appearance of the picture and increase contrast discrimination therein without perceptible effect upon the color of said picture so as not to detract from the observer's viewing thereof and to materially affect the observer's visual sensitivity for viewing the unfiltered surround.

References Cited in the file of this patent

UNITED STATES PATENTS

| Number | Name | Date |
| --- | --- | --- |
| 2,090,922 | Von Ardenne | Aug. 24, 1947 |
| 2,419,177 | Steadman | Apr. 15, 1947 |
| 2,436,847 | Wolfon | Mar. 2, 1948 |
| 2,461,464 | Aronstein | Feb. 8, 1949 |
| 2,494,992 | Ferguson | Jan. 17, 1950 |

OTHER REFERENCES

Handbook of Chemistry and Physics, 28th ed., 1944. Chemical Rubber Publishing Co., pages 2170–2194.

Optimum Efficiency Conditions for White Luminescent Screens in Kinescopes, J. O. S. A., vol. 30, #7, page 310, July 1940.